(12) United States Patent
Nave et al.

(10) Patent No.: US 7,076,862 B2
(45) Date of Patent: Jul. 18, 2006

(54) SYSTEM, METHOD, AND APPARATUS FOR INSTALLING AND REMOVING FLAT CABLE WITH RESPECT TO A PROTECTIVE SLEEVE

(75) Inventors: Shawn Michael Nave, Tucson, AZ (US); George G. Zamora, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 10/635,061

(22) Filed: Aug. 6, 2003

(65) Prior Publication Data

US 2005/0028342 A1 Feb. 10, 2005

(51) Int. Cl.
*B23P 19/00* (2006.01)
*H05K 3/30* (2006.01)
*H01R 43/00* (2006.01)
*H01R 13/00* (2006.01)
*B25F 1/00* (2006.01)

(52) U.S. Cl. ............ 29/747; 29/748; 29/759; 29/837; 29/33 M; 7/107; 439/476.1

(58) Field of Classification Search ............ 29/764, 29/748, 747, 837, 759, 760, 33 M, 235, 426.6, 29/896.9–896.92, 280, 270; 439/476.1; 7/107
See application file for complete search history.

(56) References Cited

U.S. PATENT DOCUMENTS

| | | | |
|---|---|---|---|
| 4,369,946 A * | 1/1983 | Palmer et al. ............ 248/74.2 |
| 5,555,607 A * | 9/1996 | Parveris ................. 24/129 R |
| 5,694,680 A | 12/1997 | Yamada et al. |
| 6,515,229 B1 | 2/2003 | Aoki et al. |
| 2002/0014348 A1 | 2/2002 | Aoki et al. |

\* cited by examiner

*Primary Examiner*—George Nguyen
*Assistant Examiner*—Douglas E. Mazzuca, Jr.
(74) *Attorney, Agent, or Firm*—Dale M. Crockatt; Dillon & Yudell LLP

(57) ABSTRACT

A tool for installing and removing flexible flat cable with respect to a protective sleeve has a groove for receiving the cable. The cable slides into and is formed into an arc by the groove and is supported evenly on both sides of the cable. With the full width of the cable in the groove, the tool slides down the length of the cable into the sleeve for the cable to be removed. As the tool slides into the sleeve, there is a smooth transition of the cable from flat to curved, and the cable and sleeve separate. The tool is slid through the sleeve as far as necessary for the needed action. After alternations to the sleeve or cable are complete, the tool is used to replace the cable back into the sleeve by reversing these steps.

7 Claims, 4 Drawing Sheets

SYSTEM, METHOD, AND APPARATUS FOR INSTALLING AND REMOVING FLAT CABLE WITH RESPECT TO A PROTECTIVE SLEEVE

BACKGROUND OF THE INVENTION

1. Technical Field

The present invention relates in general to an improved tool for handling flat cable and, in particular, to an improved system, method, and apparatus for installing and removing flexible flat cable into and out of, respectively, a protective sleeve or track for dynamic applications.

2. Description of the Related Art

Flexible flat cables have a plurality of electrical conductors that are molded inside a flexible, electrically insulative material or conduit. The conductors, which may be round or flat in cross-section, typically have very small dimensions and are spaced apart in a parallel configuration on narrow center-to-center spacings. These small dimensions place significant importance on handling or working with flat cables because the fragile conductors they contain are easily damaged. Because of the high cost of such flat cables, there must be assurance that the flat cable is not folded or crimped when it is handled during maintenance operations.

In some dynamic applications, such as high-speed robotic library pickers, flat cables are required to flex for millions of cycles without an electrical continuity failure or interruption. Under such conditions, the flat cables may be placed inside an elongated flexible sleeve or track in order to protect and extend the life of the flat cable. The sleeve typically has a rectangular cross-sectional profile that is similar to the shape of the flat cable. The sleeve controls the direction in which the flat cable can flex and the radius of curvature of the bend in the flat cable. Thus, the sleeve acts as an exoskeleton that further protects the flat cable.

Some sleeves do not fully envelop the flat cable, but are open on one side to permit the flat cable to be mounted in and removed from the sleeve. However, the small, fragile conductors in the flat cable can be damaged easily when the flat cable is placed in or taken out of the sleeve if the handling procedures are not performed carefully. Unfortunately, there are relatively frequent occasions in which handling of the flat cable is required after the flat cable is already installed in the sleeve. For example, the length of the flat cable and the sleeve may need to be altered, or a portion of the flat cable may need to be removed from the sleeve in order to change mounting hardware on the sleeve and/or flat cable. In addition, if only a small change is needed, or a change in only one end of the mounting hardware, it is laborious to completely remove all of the hardware from the flat cable and slide the entire flat cable out of the sleeve. For particularly long flat cables, this requires a significant amount of time and floor space to stretch out the entire flat cable. Thus, an improved system, method, and apparatus for installing and removing flexible flat cable into and/or out of a protective sleeve for dynamic applications is needed.

SUMMARY OF THE INVENTION

One embodiment of a system, method, and apparatus for installing and removing flexible flat cable into and out of a protective sleeve utilizes a tool having a single part that is snapped over the flat cable to allow the flat cable to smoothly slide into and out of the sleeve. The tool can partially remove the flat cable from the sleeve while protecting the flat cable from being damaged. After removal, the tool can also be used to easily and protectively return the flat cable into the sleeve. In addition, the tool does not require the entire flat cable to be removed from the sleeve. Moreover, existing hardware at an unaltered end of the flat cable assembly can be left in place. In addition, the tool can be used while a majority of the flat cable is rolled up. Furthermore, the tool can initially be applied to and engage any portion of the flat cable located outside of the sleeve. Thus, the tool does not need to start at the terminal ends of the flat cable in order to be utilized.

The tool is designed to work in conjunction with the protective sleeve, which fully contains the flat cable but has an opening that aids in the sleeve being able to flex. The flat cable generally fills the entire width of the sleeve when installed. Using the tool, the flat cable can be removed through the opening in the sleeve. The tool works by sliding part of the flat cable that is not in the sleeve into a groove that is formed in the tool. The groove forms the flat cable into an arcuate shape, giving it a smooth radius by supporting it evenly on both sides of the flat cable. The flat cable does not get creased or folded. With the full width of the flat cable located in the groove of the tool, the tool can slide down the longitudinal length of the flat cable and into the sleeve in order to remove the flat cable. As the tool slides into the sleeve, there is a smooth transition of the flat cable from a flat shape to a curved shape. As the tool moves into the sleeve, the flat cable and sleeve separate because of the interaction between the flat cable and the tool. The tool slides through the sleeve as far as necessary for the needed action. After the alterations to the sleeve and/or flat cable are complete, the tool can be used to replace the flat cable back into the sleeve by sliding the tool back through the sleeve in a smooth, safe motion. Finally, the tool is removed from the flat cable by sliding the flat cable back out of the groove in the tool.

Another aspect of the tool of the present invention is that an outside wall of the tool (i.e., the portion located radially outside of the groove) is flexible to aid in allowing the flat cable to easily enter and exit the groove. In addition, the edges of the tool along the groove are very smooth so as to not catch or shave the flat cable. In contrast, prior art solutions required removal of the entire flat cable from the sleeve, or removal of the hardware from both ends of the flat cable assembly, and for the entire flat cable to be removed from the sleeve.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
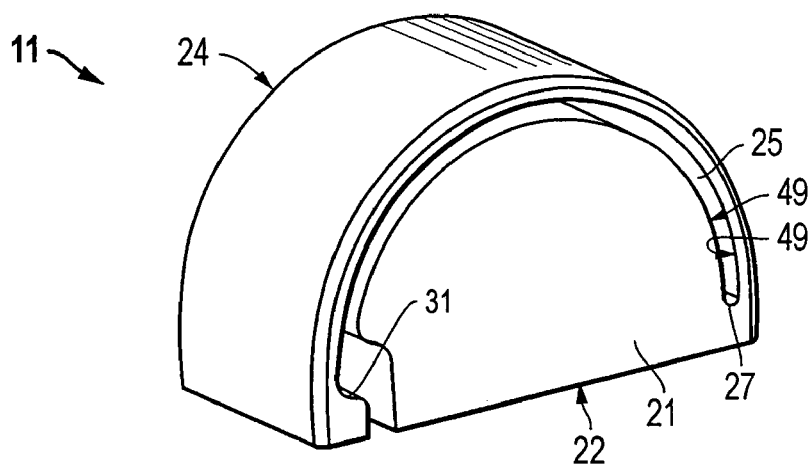
FIG. 1 is an isometric view of a flat cable insertion and removal tool constructed in accordance with the present invention.
Figure 2:
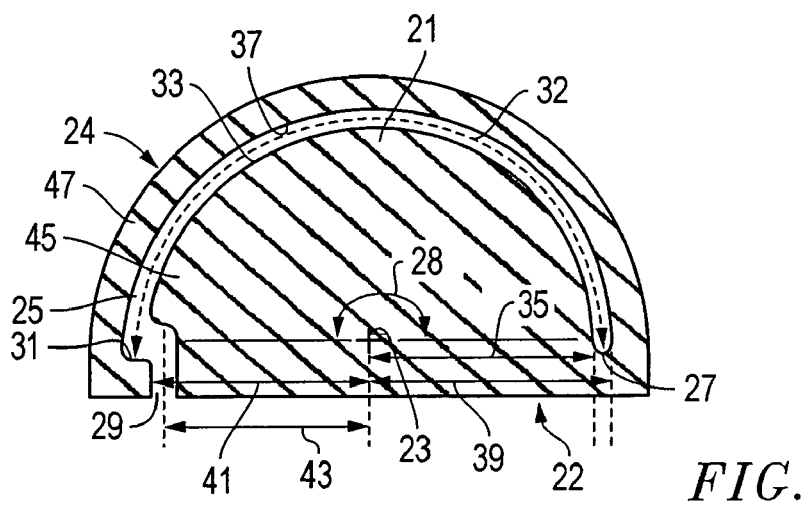
FIG. 2 is a sectional front view of the tool of FIG. 1.

Referring to FIGS. 1 and 2, one embodiment of an apparatus or tool 11 for installing and removing a flexible flat cable 13 (FIG. 3) with respect to a protective sleeve 15 is shown. The flexible flat cable 13 has a plurality of electrical conductors 14 that are molded or laminated inside a flexible, electrically insulative material or conduit 16. The conductors 14, which may be round or flat in cross-section, typically have very small dimensions and are spaced apart in a parallel configuration on narrow center-to-center spacings. Although only one cable 13 is shown inside the sleeve 15, the sleeve 15 is capable of supporting more than one cable 13 when the cables 13 are stacked flat against each other.

Figure 5:
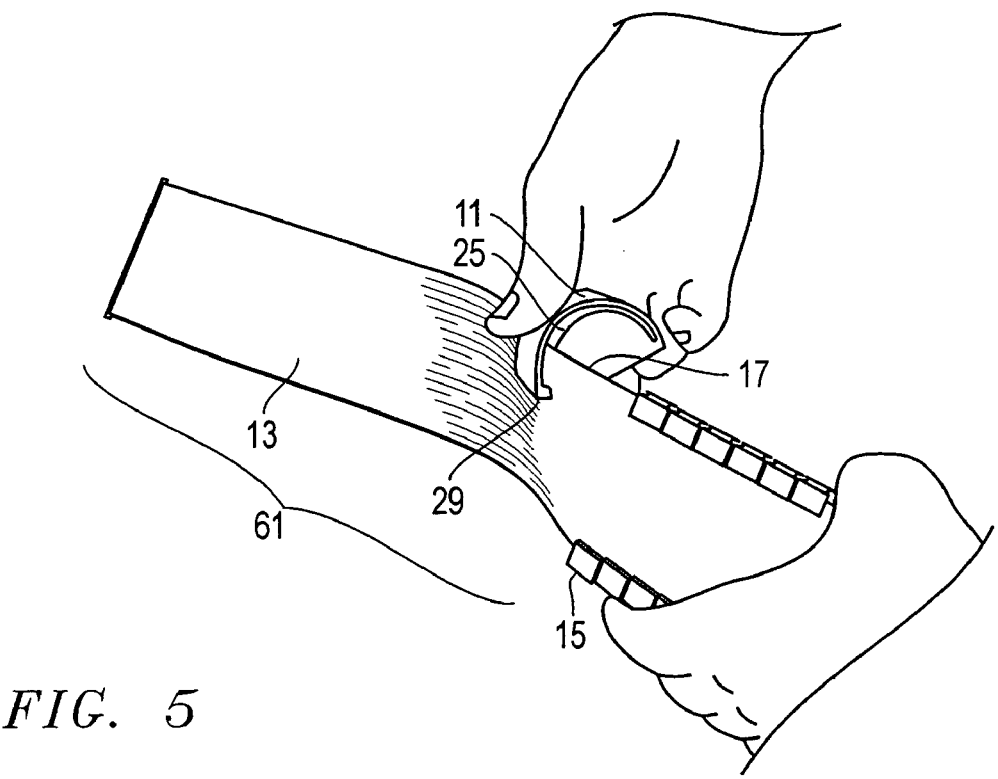
FIG. 5 is an isometric view of the tool of FIG. 1 at an initial stage of removing the flat cable from the sleeve, after the stage of FIG. 4.
Figure 6:
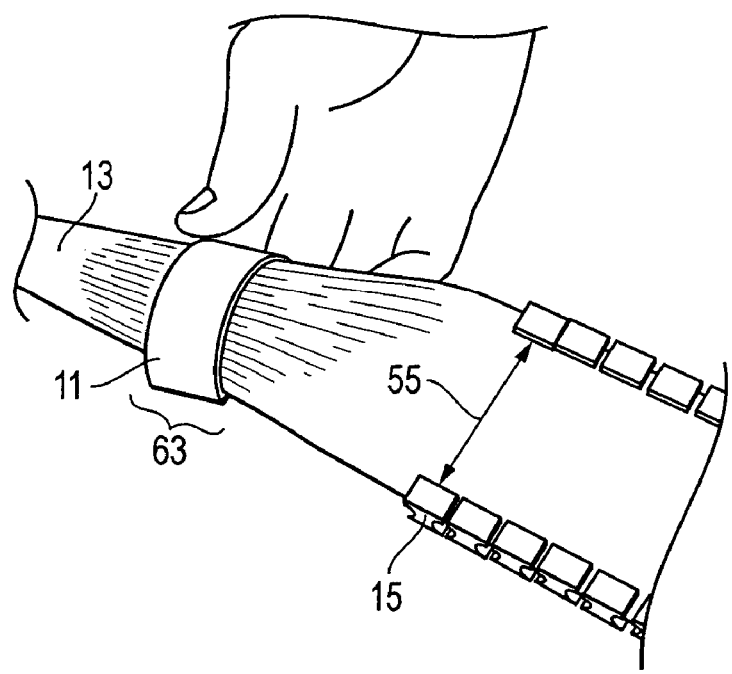
FIG. 6 is an isometric view of the tool of FIG. 1 at a subsequent stage of removing the flat cable from the sleeve, after the stage of FIG. 5.
Figure 7:
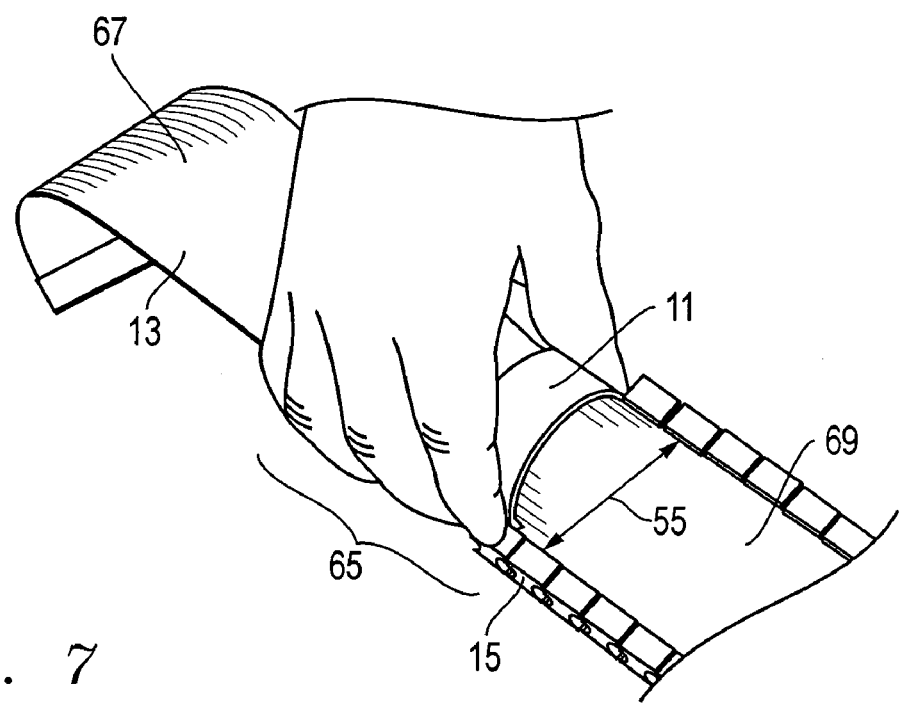
FIG. 7 is an isometric view of the tool of FIG. 1 at a subsequent stage of removing the flat cable from the sleeve, after the stage of FIG. 6.

The tool 11 comprises a body 21 having a flat lower surface 22 and a curved upper surface 24. The body 21 also has a longitudinal axis 23 (FIG. 2) and a slot 25 formed in the body 21. The slot 25 extends longitudinally through the body 21 about the axis 23. The slot 25 has a generally arcuate shape with a closed end 27 on one side of the body 21, and an open end 29 on an opposite side of the body 21. The open end 29 forms a receptacle that is allows lateral ingress and egress of the flexible flat cable 13 (FIG. 5).

Figure 9:
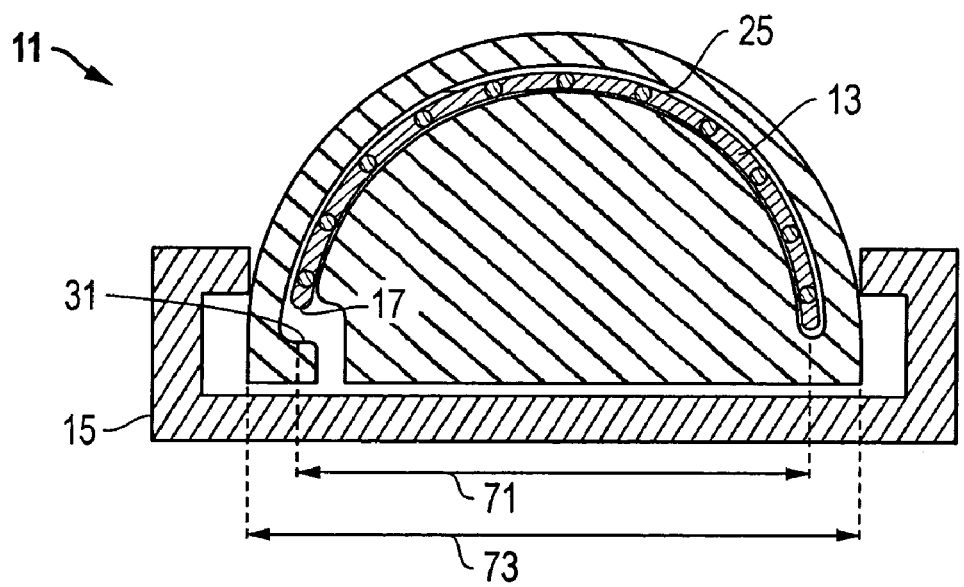
FIG. 9 is a sectional front view of the flexible flat cable located in the tool of FIG. 1 during removal and/or installation with respect to the protective sleeve.

The tool 11 also has a shelf 31 that is formed in the body 21 adjacent to the open end 29 of the slot 25. The shelf 31 captures a side edge 17 of the flexible flat cable 13 (FIG. 9) in order to retain the flexible flat cable 13 in the body 21 when the flexible flat cable 13 is located in the slot 25. The arcuate shape of the slot 25 is, in the embodiment shown, semi-circular, and spans an arc 28 of approximately 180 degrees (FIG. 2). The slot 25 supports an entire lateral width 32 of the flexible flat cable 21 (FIGS. 9, 2, and 3), such that the slot 25 has a circumferential length extending from the closed end 27 to the shelf 31 that is approximately equal to the lateral width of the flexible flat cable 13. The slot 25 also defines an inner wall 33 having an inner radius 35, and an outer wall 37 having an outer radius 39. The outer radius 39 is greater than the inner radius 35, and the shelf 31 is formed at a shelf radius 41 that is greater than a radius 43 of the open end 29.

The slot 25 also segments the body 21 into a lower portion 45 (FIG. 2) and an upper portion 47. In the embodiment shown, the upper portion 47 is cantilevered and flexible relative to the lower portion 45. The lower and upper portions 45, 47 of the body 21 have edges 49 (FIG. 1) that are very smooth and beveled or polished in order to avoid scuffing the surfaces of the flexible flat cable 13. All edges 49 on body 21 (on both longitudinal ends) are smooth. The shelf (31) is positioned on the upper portion (47) such that it lies in a longitudinal plane with the bottom surface of the lower portion (45).

Figure 3:
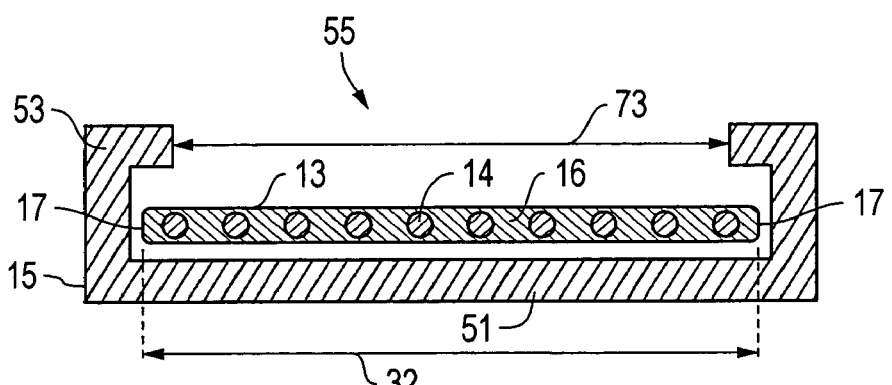
FIG. 3 is a sectional front view of a flat cable located in a protective sleeve/track.
Figure 4:
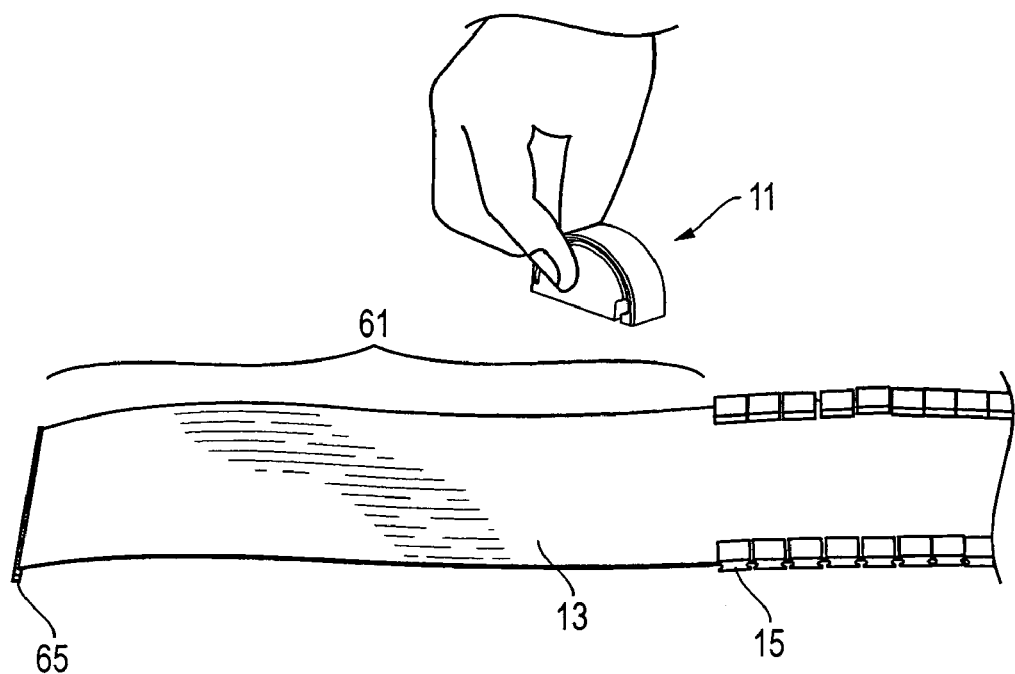
FIG. 4 is an isometric view of the tool of FIG. 1 prior to removing the flat cable from the sleeve of FIG. 3.

In operation (FIGS. 4–9), the present invention also comprises a system and method of using the tool 11 to install and/or remove the flexible flat cable 13 with respect to the protective sleeve 15. As best shown in FIG. 3, the protective sleeve 15 has a base 51, side walls 53, and a longitudinal opening 55 defined between the side walls 53. The flexible flat cable 13 is positioned in the protective sleeve 15 and extends laterally between the side walls 53. The flexible flat cable 13 has an exposed portion 61 (FIG. 4) that is not located in the protective sleeve 15. Although the exposed portion 61 is shown at the longitudinal end 65 of the flexible flat cable 15, the exposed portion 61 may be located anywhere along the longitudinal length of the flexible flat cable 13 and/or protective sleeve 15.

The method of removing the flexible flat cable 13 from the protective sleeve 15 comprises inserting the side edge 17 (FIG. 5) of the exposed portion 61 of the flexible flat cable 13 into the open end 29 of the tool 11. The flexible flat cable 13 is guided through the slot 25 in the tool 11, such that a longitudinal segment 63 (FIG. 6) of the flexible flat cable 13 is formed into an arcuate shape with a smooth radius that protects the integrity of the flexible flat cable 13. The tool 11 is moved longitudinally with respect to and along a length of the flexible flat cable 13 such that the longitudinal segment 63 of the flexible flat cable 13 in the arcuate shape transitions and moves smoothly with the tool 11 as the flexible flat cable 13 passes through the tool 11, while other portions 67, 69 (FIG. 7) of the flexible flat cable 13 on either longitudinal side of the longitudinal segment 53 transition to a flat shape. As the tool 11 moves into contact with the protective sleeve 15 (FIGS. 7–9), the flexible flat cable 13 is extracted from the longitudinal opening 55 of the protective sleeve 15.

The method also comprises installing the flexible flat cable 13 in the protective sleeve 15 by simply reversing these steps. By doing so, the flexible flat cable 13 flattens out from the arcuate shape and into the longitudinal opening 55 in the protective sleeve 15 between the side walls 53 as the tool 11 is moved away from the protective sleeve 15 (see, in order, FIG. 8, then FIG. 7, then FIG. 6).

Figure 8:
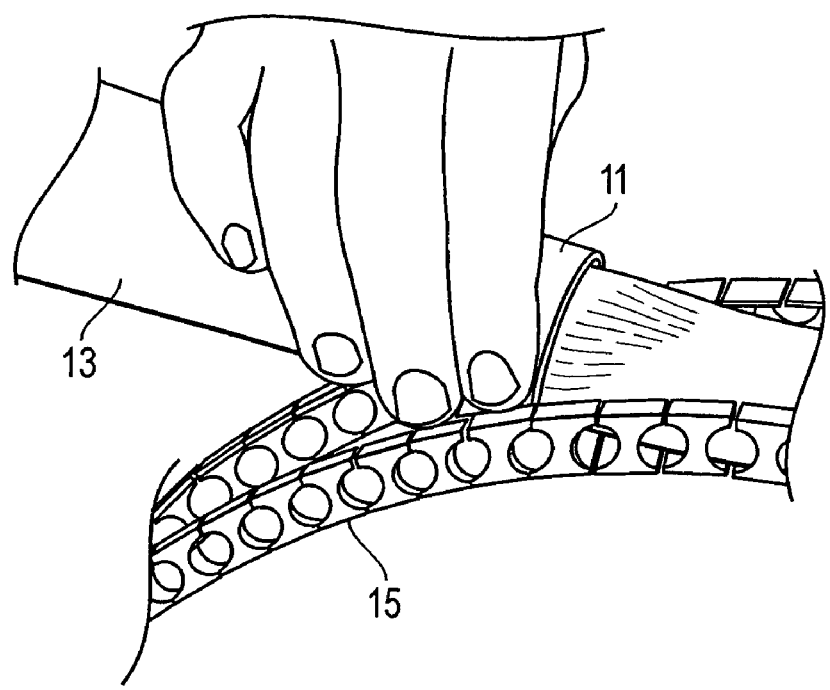
FIG. 8 is an isometric view of the tool of FIG. 1 at a subsequent stage of removing the flat cable from the sleeve, after the stage of FIG. 7.

During operation, the longitudinal segment 63 (FIG. 7) of the flexible flat cable 13 defines a chord 71 (FIG. 9) having a dimension that is less than a lateral dimension 73 of the longitudinal opening 55 in the protective sleeve 15. As a result, the flexible flat cable 13 can be removed from the protective sleeve 15 with the tool 11. The tool 11 can be used while a majority of the flexible flat cable 13 and/or protective sleeve 15 is rolled up (FIG. 8). Moreover, only that portion of the flexible flat cable 13 in need of attention (e.g., exposed portion 61; FIG. 5) need be removed from the protective sleeve 15. In other words, the tool 11 can be applied to and engage the longitudinal portion or segment 63 of the flexible flat cable 13 located in the protective sleeve 15 such that the entire flexible flat cable 13 need not be removed from the protective sleeve 15. As a result, the flexible flat cable 13 is not creased or folded by the tool 11.

The present invention has several advantages, including the ability to install and remove flexible flat cable into and out of a protective sleeve. The invention utilizes a tool having a single part that is snapped over the flat cable to allow the flat cable to smoothly slide into and out of the sleeve. The tool can partially remove the flat cable from the sleeve while protecting the flat cable from being damaged. After removal, the tool can also be used to easily and protectively return the flat cable into the sleeve. In addition, the tool does not require the entire flat cable to be removed from the sleeve. Moreover, existing hardware at an unaltered end of the flat cable assembly can be left in place. In addition, the tool can be used while a majority of the flat cable is rolled up. Furthermore, the tool can initially be applied to and engage any portion of the flat cable located outside of the sleeve. Thus, the tool does not need to start at the terminal ends of the flat cable in order to be utilized.

The tool is designed to work in conjunction with the protective sleeve, which fully contains the flat cable but has an opening that aids in the sleeve being able to flex. The flat cable generally fills the entire width of the sleeve when installed. Using the tool, the flat cable can be removed through the opening in the sleeve. A groove in the tool forms the flat cable into an arcuate shape, giving it a smooth radius by supporting it evenly on both sides of the flat cable so that the flat cable does not get creased or folded. The tool also can be used to replace the flat cable back into the sleeve by sliding the tool back through the sleeve in a smooth, safe motion. The edges of the tool along the groove are very smooth so as to not catch or shave the flat cable.

While the invention has been shown or described in only some of its forms, it should be apparent to those skilled in the art that it is not so limited, but is susceptible to various changes without departing from the scope of the invention.

What is claimed is:

1. A tool for installing and removing a flexible flat cable with respect to a protective sleeve having a longitudinal opening therein, the tool comprising:

a body having a longitudinal axis and a slot formed in the body longitudinally about the axis, the slot having a generally arcuate shape with a closed end on one side of the body, and an open end on an opposite side of the body, wherein, the open end forms a receptacle that is adapted to allow lateral ingress and egress of the flexible flat cable, and when a longitudinal section of the flexible flat cable is located in the slot, the longitudinal section of the flexible flat cable defines a chord having a dimension that is less than a lateral dimension of the longitudinal opening of the protective sleeve;

and a shelf formed in the body adjacent to the open end of the slot that is adapted to capture a side edge of the flexible flat cable in order to retain the longitudinal section of the flexible flat cable in the body; wherein, the slot segments the body into a lower portion, having a bottom surface, and an upper portion; such that the shelf is connected to the upper portion, and the shelf lies in a longitudinal plane along with said bottom surface of the lower portion.

2. The tool of claim 1, wherein the arcuate shape of the slot is semi-circular, spans approximately 180 degrees, and is adapted to support an entire width of the flexible flat cable, and the slot has a circumferential length extending from the closed end to the shelf that is approximately equal to a lateral dimension of the flexible flat cable.

3. The tool of claim 1, wherein the slot defines an inner wall having an inner radius, and an outer wall having an outer radius, such that the outer radius is greater than the inner radius, and the shelf is formed at a shelf radius that is greater than a radius of the open end.

4. The tool of claim 1, wherein the upper portion is cantilevered and flexible relative to the lower portion.

5. The tool of claim 4, wherein the lower and upper portions of the body have edges that are polished or beveled to avoid scuffing the flexible flat cable.

6. The tool of claim 1, wherein the slot segments the body into a flat lower surface and a curved upper surface, and the flat lower surface is adapted to contact a planar base of the protective sleeve.

7. The tool of claim 1, wherein the flexible flat cable has a first planar side and a second planar side, when the longitudinal section of the flexible flat cable is located in the slot, the longitudinal section of the flexible flat cable retains a smooth radius supported evenly on both the first planar side and the second planar side.

* * * * *